(12) United States Patent
Lee et al.

(10) Patent No.: US 11,823,383 B2
(45) Date of Patent: Nov. 21, 2023

(54) COMPUTER SYSTEM FOR AUTOMATICALLY SEARCHING FOR MENTAL DISORDER DIAGNOSIS PROTOCOL AND METHOD THEREOF

(71) Applicant: Korea Advanced Institute of Science and Technology, Daejeon (KR)

(72) Inventors: Sang Wan Lee, Daejeon (KR); Young Ho Kang, Daejeon (KR); Fengkai Ke, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 380 days.

(21) Appl. No.: 17/229,747

(22) Filed: Apr. 13, 2021

(65) Prior Publication Data
US 2022/0164948 A1 May 26, 2022

(30) Foreign Application Priority Data
Nov. 20, 2020 (KR) .................. 10-2020-0156681

(51) Int. Cl.
*G06T 7/00* (2017.01)
*G06N 3/045* (2023.01)

(52) U.S. Cl.
CPC .......... *G06T 7/0012* (2013.01); *G06N 3/045* (2023.01); *G06T 2207/20081* (2013.01); *G06T 2207/20084* (2013.01); *G06T 2207/30016* (2013.01)

(58) Field of Classification Search
CPC ......... G06T 7/0012; G06T 2207/20081; G06T 2207/20084; G06T 2207/30016;
(Continued)

(56) References Cited

U.S. PATENT DOCUMENTS

| | | | |
|---|---|---|---|
| 11,379,981 B1* | 7/2022 | Saeed | G06T 7/0014 |
| 2005/0019734 A1* | 1/2005 | Peled | A61B 5/7264 |
| | | | 434/236 |

(Continued)

FOREIGN PATENT DOCUMENTS

| | | |
|---|---|---|
| JP | 2012003335 A | 1/2012 |
| JP | 2020126284 A | 8/2020 |

(Continued)

OTHER PUBLICATIONS

Fengkai Ke et al. "Exploring the Structural and Strategic Bases of Autism Spectrum Disorders With Deep Learning," 13 pages, IEEE Access, Aug. 14, 2020.

(Continued)

*Primary Examiner* — Van D Huynh
(74) *Attorney, Agent, or Firm* — PCFB LLC

(57) ABSTRACT

Provided are a computer system for automatically searching for a mental disorder diagnosis protocol and an method thereof that may determine at least one test region to be examined for a predetermined mental disorder diagnosis in a brain image of a patient based on a first artificial neural network, may determine a test process for the mental disorder diagnosis for the patient based on a second artificial neural network, and may provide a test protocol for the mental disorder diagnosis for the patient based on the test region and the test process. The computer system may visualize at least one of a position, a shape, a size, and an importance of the test region in the brain image. The test process may include test order of a plurality of test stages in which the brain image is to be used for the mental disorder diagnosis.

18 Claims, 13 Drawing Sheets

(58) Field of Classification Search
CPC .......... G06T 2207/10088; G06T 2207/10104; G06N 3/045; G06N 3/044; G06N 3/08; G06N 20/00; G16H 20/70; G16H 50/20; G16H 50/30; G16H 50/70

See application file for complete search history.

(56) References Cited

U.S. PATENT DOCUMENTS

| | | | |
|---|---|---|---|
| 2017/0251985 A1* | 9/2017 | Howard | G16H 70/60 |
| 2019/0133446 A1* | 5/2019 | Emerson | A61B 5/4064 |
| 2019/0148021 A1* | 5/2019 | Styner | G06N 20/10 |
| | | | 705/2 |
| 2019/0209097 A1* | 7/2019 | Martien | A61B 5/7282 |
| 2023/0015296 A1* | 1/2023 | Klin | G16H 50/30 |

FOREIGN PATENT DOCUMENTS

| | | |
|---|---|---|
| WO | 2019112050 A1 | 6/2019 |
| WO | 2020218460 A1 | 10/2020 |

OTHER PUBLICATIONS

"Artificial intelligence predicts symptoms of autism and severity," 5 pages, Yonsei University Severance, Aug. 8, 2020.

* cited by examiner

COMPUTER SYSTEM FOR AUTOMATICALLY SEARCHING FOR MENTAL DISORDER DIAGNOSIS PROTOCOL AND METHOD THEREOF

CROSS-REFERENCE TO RELATED APPLICATION

This application claims the priority benefit of Korean Patent Application No. 10-2020-0156681, filed on Nov. 20, 2020, in the Korean Intellectual Property Office, the disclosure of which is incorporated herein by reference in its entirety.

BACKGROUND

1. Field of the Invention

The following description of example embodiments relates to a computer system for automatically searching for a mental disorder diagnosis protocol and a method thereof.

2. Description of the Related Art

In general, in the case of diagnosing a mental disease such as autism spectrum disorder (ASD), it is very difficult to independently draw an accurate conclusion due to its complex psychiatric symptoms and insufficient neurobiological evidence. Also, although the conclusion is drawn, there is a difficulty in presenting variables that are medical structural and strategic evidence supporting the corresponding conclusion. In addition, it may be impossible to present an argument that lists a plurality of pieces of medical evidence used to draw the conclusion in time-efficient diagnosis order. Meanwhile, in the case of performing a simple classification systemization on a high-complex mental disorder diagnosis based on a typical modeling method, the reliability for drawing a conclusion is not high due to black-box characteristics.

SUMMARY

Example embodiments provide a computer system capable of automatically searching for a highly reliable mental disorder diagnosis protocol through an application machine learning based on an artificial neural network and a method thereof.

According to an aspect, there is provided a method performed by a computer system, the method including determining at least one test region to be examined for a predetermined mental disorder diagnosis in a brain image of a patient based on a first artificial neural network; determining a test process for the mental disorder diagnosis for the patient based on a second artificial neural network; and providing a test protocol for the mental disorder diagnosis for the patient based on the test region and the test process.

According to another aspect, there is provided computer system including a memory; and a processor configured to connect to the memory and to execute at least one instruction stored in the memory. The processor is configured to determine at least one test region to be examined for a predetermined mental disorder diagnosis in a brain image of a patient based on a first artificial neural network, determine a test process for the mental disorder diagnosis for the patient based on a second artificial neural network, and provide a test protocol for the mental disorder diagnosis for the patient based on the test region and the test process.

According to another aspect, there is provided a non-transitory computer-readable record medium storing instructions that, when executed by a processor, cause the processor to perform the method including determining at least one test region to be examined for a predetermined mental disorder diagnosis in a brain image of a patient based on a first artificial neural network; determining a test process for the mental disorder diagnosis for the patient based on a second artificial neural network; and providing a test protocol for the mental disorder diagnosis for the patient based on the test region and the test process.

According to some example embodiments, a computer system may automatically search for a highly reliable mental disorder diagnosis protocol through an application machine learning based on an artificial neural network and a method thereof. Here, the computer system may determine a test region to be examined for a mental disorder diagnosis in a brain image and a test process for the mental disorder diagnosis and may provide a test protocol for a patient as a guideline for the mental disorder diagnosis of the patient based on the determined test region and test process. Through this, a user of the computer system may more accurately and easily diagnose a mental disorder of the patient based on the test protocol. Here, the user may probabilistically diagnose presence or absence of the mental disorder of the patient and may predict the severity of the mental disorder, which may lead to reducing an amount of time and cost used for the mental disorder diagnosis and further quickly performing the mental disorder diagnosis at high reliability.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
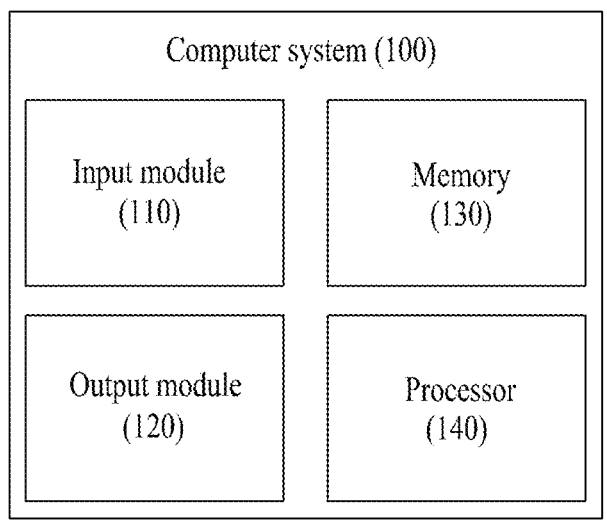
FIG. 1 is a diagram illustrating an example of a computer system according to example embodiments.

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

When a component is described to be on another component, the component may be directly formed on the other component or a third component may be provided between the components. Also, in the drawings, thicknesses of components may be exaggerated to effectively describe technical content. Unless otherwise noted, like reference numerals refer to like components throughout the attached drawings and written description, and thus descriptions will not be repeated.

The example embodiments described herein will be described with the accompanying drawings. In the drawings, thicknesses of layers, regions, etc., may be exaggerated for effective description of the technical content. Accordingly, regions illustrated in the drawings may have general attributes and shapes of the regions are merely provided as examples and not construed to limit the scope of the disclosure.

Hereinafter, the example embodiments are described with reference to the accompanying drawings.

Figure 2:
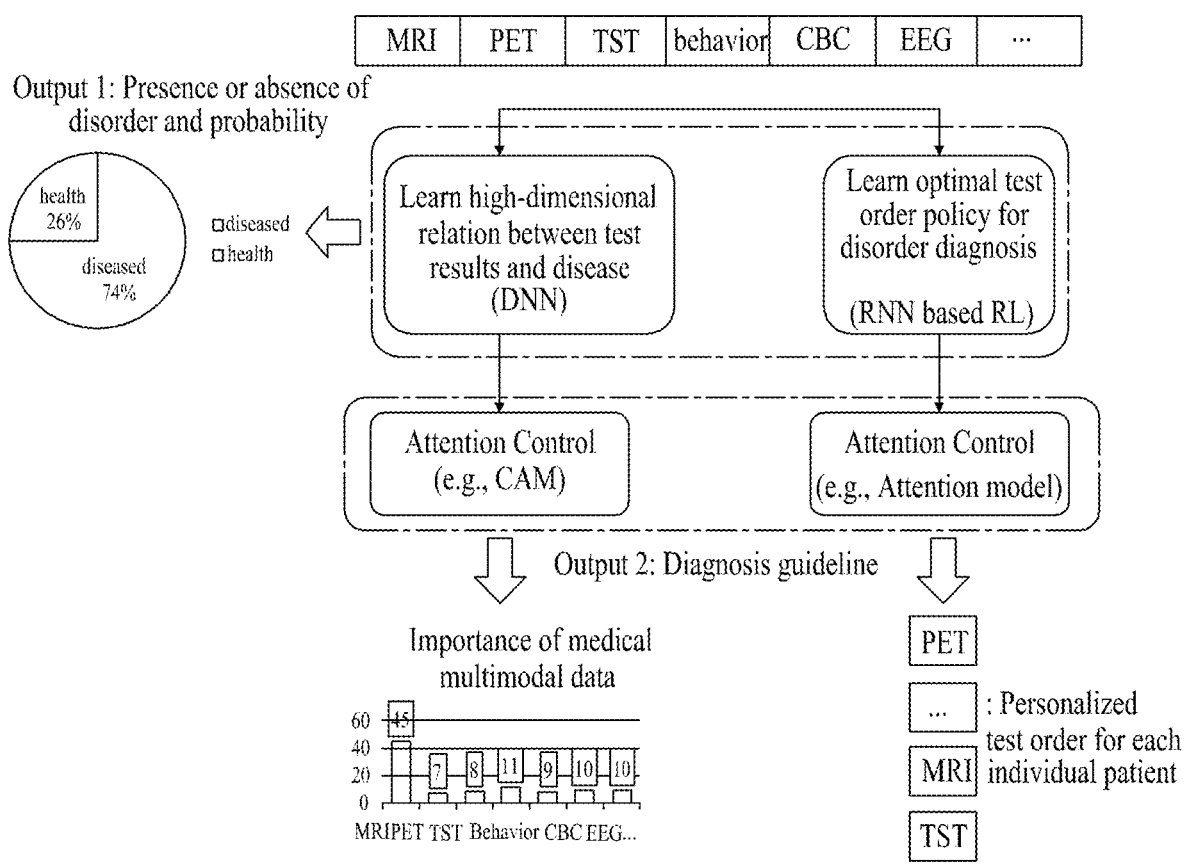
FIG. 2 illustrates an example of describing an operation characteristic of the computer system of FIG. 1.
Figure 3A:
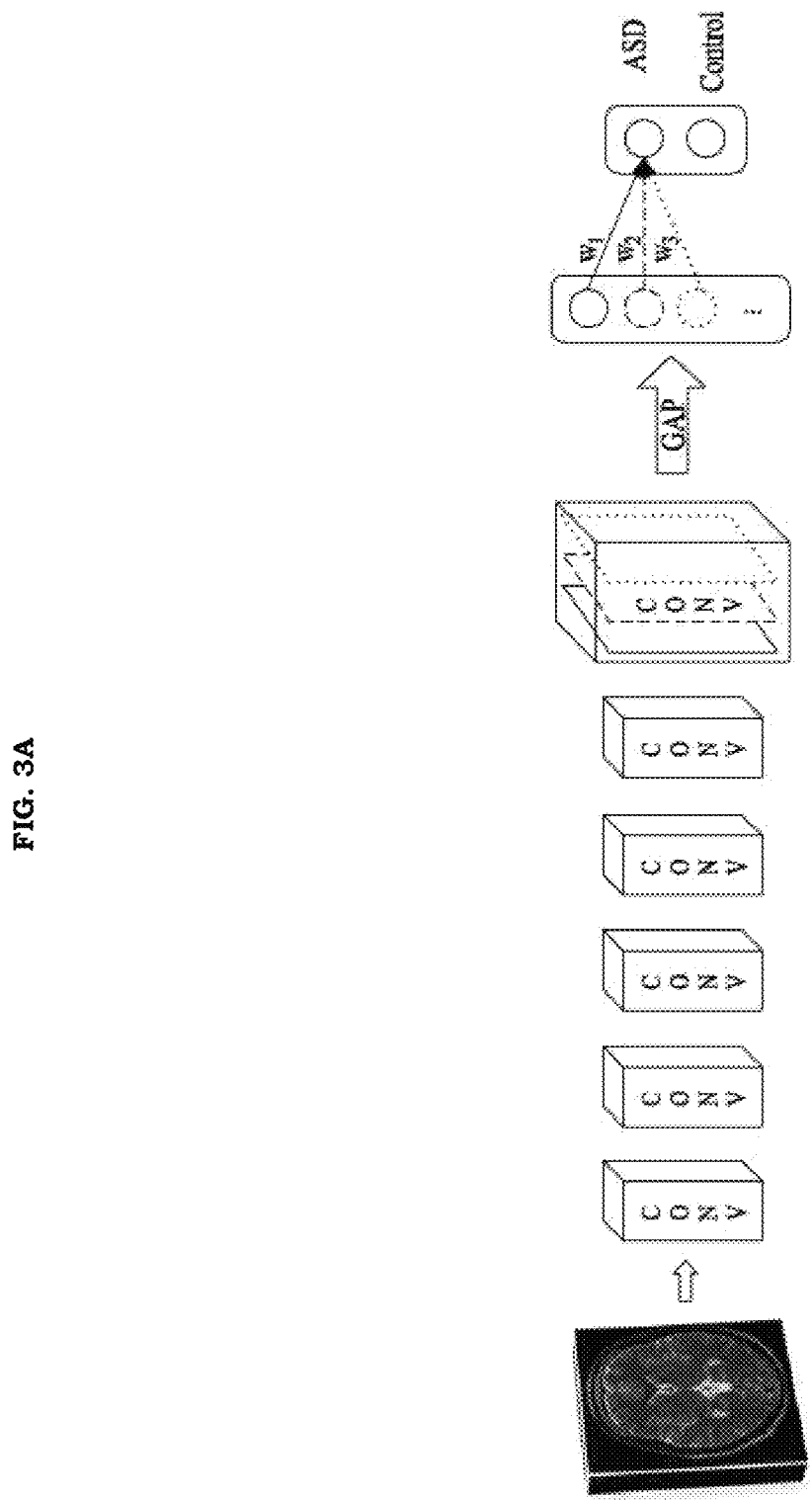
FIGS. 3A and 3B illustrate examples of a first artificial neural network of a computer system according to example embodiments.
Figure 3B:
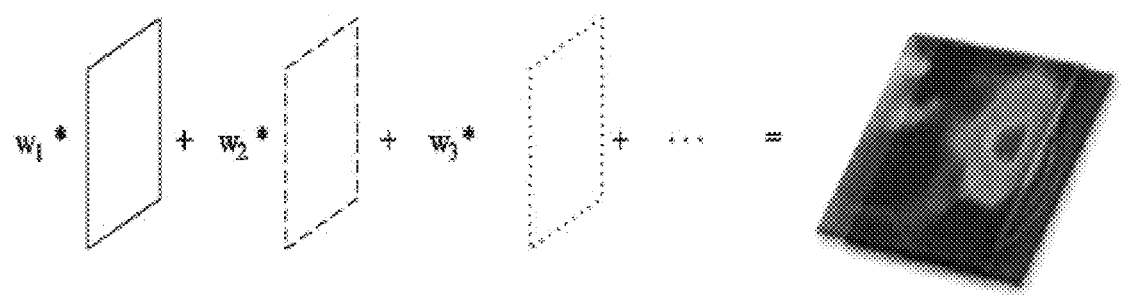
Figure 5:
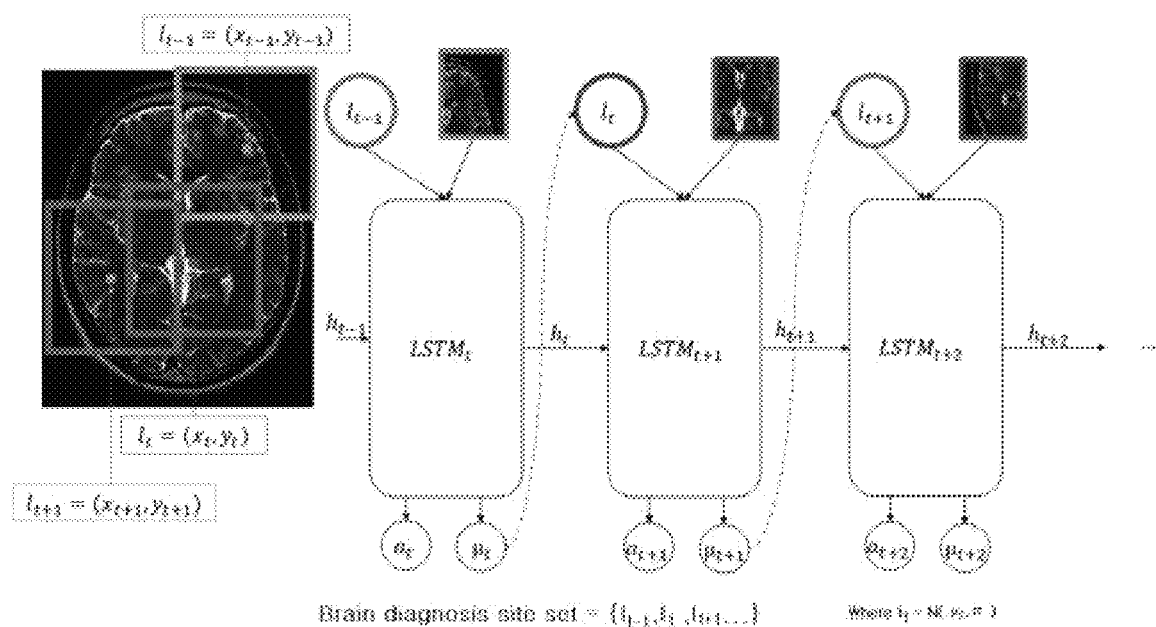
FIG. 5 illustrates an example of a second artificial neural network of a computer system according to example embodiments.
Figure 6A:
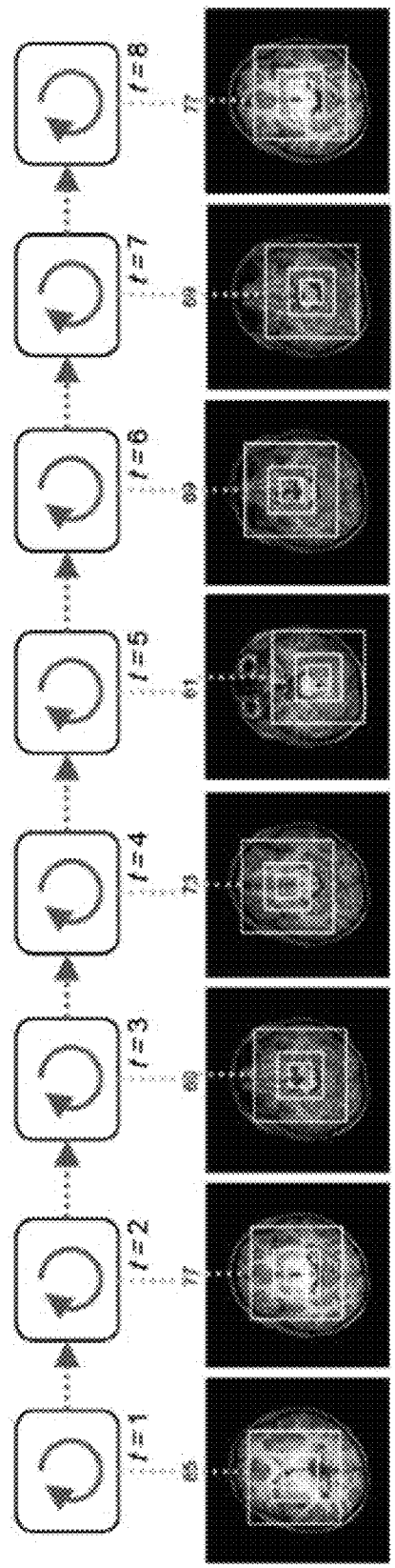
FIGS. 6A, 6B, and 6C illustrate examples of describing an operation characteristic of a second artificial neural network of a computer system according to example embodiments.
Figure 6B:
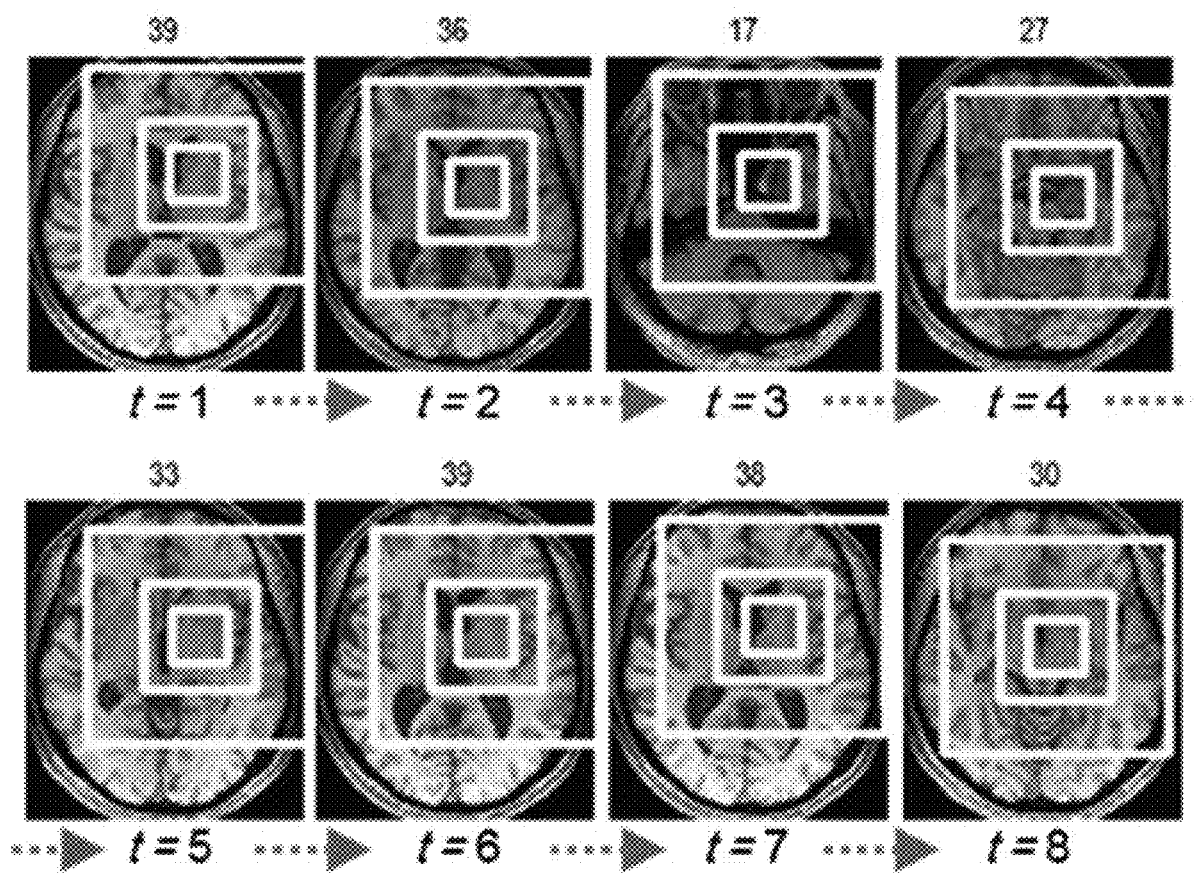
Figure 6C:
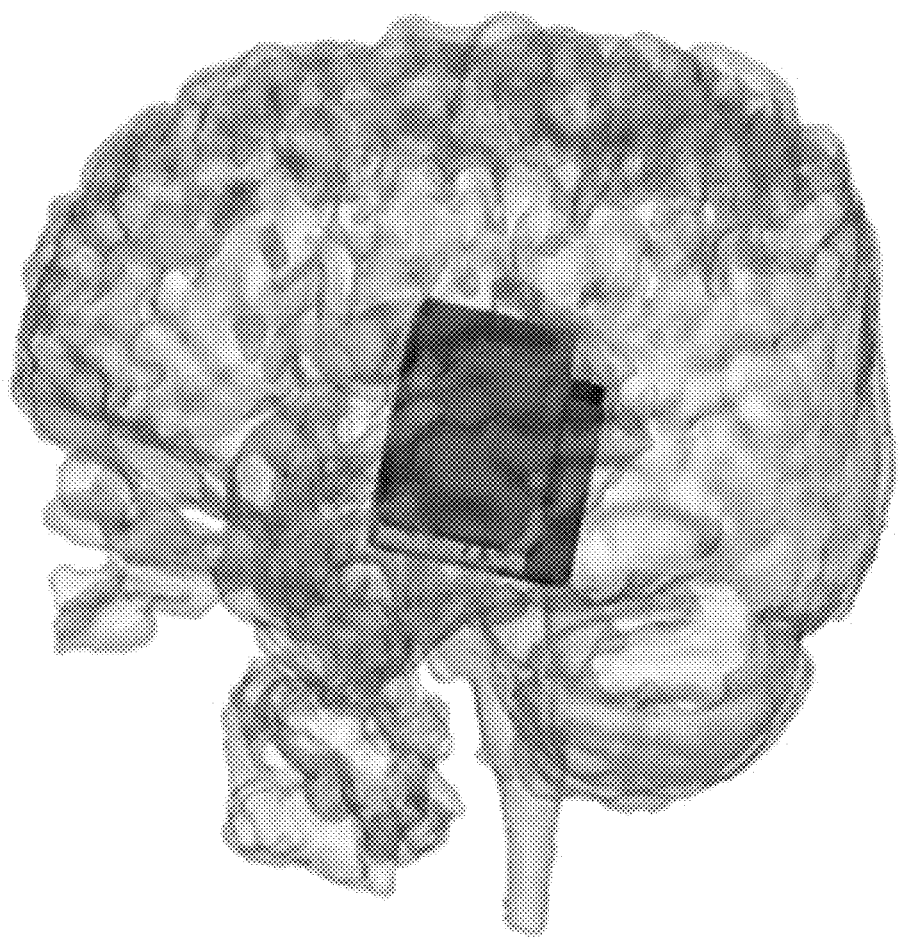

FIG. 1 is a diagram illustrating an example of a computer system 100 according to example embodiments. FIG. 2 illustrates an example of describing an operation characteristic of the computer system 100 of FIG. 1. FIGS. 3A and 3B illustrate examples of a first artificial neural network of the computer system 100 according to example embodiments. FIGS. 4A, 4B, 4C, and 4D illustrate examples of describing an operation characteristic of the first artificial neural network of the computer system 100 according to example embodiments. FIG. 5 illustrates an example of a second artificial neural network of the computer system 100 according to example embodiments. FIGS. 6A, 6B, and 6C illustrate examples of describing an operation characteristic of the second artificial neural network of the computer system 100 according to example embodiments.

Referring to FIG. 1, the computer system 100 according to example embodiments may include at least one of an input module 110, an output module 120, a memory 130, and a processor 140. In some example embodiments, at least one of components of the computer system 100 may be omitted and at least one another component may be added. Depending on example embodiments, at least two of the components of the computer system 100 may be implemented as a single integrated circuit. Here, the computer system 100 may include at least one device, for example, at least one of at least one server and at least one electronic device. In some example embodiments, when the computer system 100 includes a plurality of devices, the components of the computer system 100 may be configured in one of the plurality of devices or may be distributed over at least two of the plurality of devices.

The input module 110 may input a signal to be used for at least one component of the computer system 100. The input module 110 may include at least one of an input device configured to allow a user to directly input a signal to the computer system 100, a sensor device configured to sense a peripheral change and to create a signal, and a reception device configured to receive a signal from an external device. For example, the input device may include at least one of a microphone, a mouse, and a keyboard. In some example embodiments, the input device may include at least one of a touch circuitry configured to sense a touch and a sensor circuitry configured to measure strength of a force generated by the touch.

The output module 120 may output information to an outside of the computer system 100. The output module 120 may include at least one of a display device configured to visually output information, an audio output device configured to output information as an audio signal, and a transmission device configured to wirelessly transmit information. For example, the display device may include at least one of a display, a hologram device, and a projector. For example, the display device may be implemented as a touchscreen through assembly with at least one of the touch circuitry and the sensor circuitry of the input module 110. For example, the audio output device may include at least one of a speaker and a receiver.

According to an example embodiment, the reception device and the transmission device may be implemented as a communication module. The communication module may communicate with an external device in the computer system 100. The communication module may establish a communication channel between the computer system 100 and the external device and may communicate with the external device through the communication channel. Here, the external device may include at least one of a satellite, a base station, a server, and another computer system. The communication module may include at least one of a wired communication module and a wireless communication module. The wired communication module may connect to the external device in a wired manner and may communicate with the external device in a wired manner. The wireless communication module may include at least one of a near field communication module and a far field communication module. The near field communication module may communicate with the external device through a near field communication scheme. For example, the near field communication scheme may include at least one of Bluetooth, wireless fidelity (Wi-Fi) direct, and infrared data association (IrDA). The far field communication module may communicate with the external device through a far field communication scheme. Here, the far field communication module may communicate with the external device over a network. For example, the network may include at least one of a cellular network, the Internet, and a computer network such as a local area network (LAN) and a wide area network (WAN).

The memory 130 may store a variety of data used by at least one component of the computer system 100. For example, the memory 130 may include at least one of a volatile memory and a non-volatile memory. The data may include at least one program and input data or output data related thereto. The program may be stored in the memory 130 as software that includes at least one instruction and may include at least one of an operating system (OS), middleware, and an application.

The processor 140 may control at least one component of the computer system 100 by executing the program of the memory 130. Through this, the processor 140 may perform data processing or operation. Here, the processor 140 may execute an instruction stored in the memory 130.

According to example embodiments, the processor 140 may provide a test protocol for a mental disorder diagnosis from a brain image of a patient. For example, mental disorder may include autism spectrum disorder (ADS). Here, the test protocol represents a test policy for the mental disorder diagnosis of the patient and may include at least one test region in the brain image and a test process. Here, the test region may represent a region to be examined for the mental disorder diagnosis in the brain image. A plurality of test stages may be present for the mental disorder diagnosis. The test process may include at least one of progress order of the plurality of test stages and test order of a plurality of test regions in the brain image.

According to example embodiments, the processor 140 may provide a test protocol from a brain image of a patient based on an artificial neural network. The artificial neural network may include a first artificial neural network and a second artificial neural network. Referring to FIG. 2, the processor 140 may analyze vectorized medical multimodal data being input, based on each of the first artificial neural network and the second artificial neural network. Here, the medical multimodal data may include a plurality of data items acquired using different methods and the data items may include the brain image and at least one another data item. The brain image may be created through, for example, at least one of magnetic resonance imaging (MRI) and positron emission tomography (PET). The other data item may include at least one of, for example, thromboplastin screening test (TST) results, complete blood count (CBC) results, and electroencephalogram (EEG) results. To this end, the first artificial neural network and the second artificial neural network may be pretrained based on bigdata that is pre-collected in association with the mental disorder diagnosis. Referring to FIG. 2, the processor 140 may output information regarding whether the patient has a mental disorder and a corresponding probability based on analysis results of the first artificial neural network and analysis results of the second artificial neural network. Here, the processor 140 may combine the analysis results of the first artificial neural network and the analysis results of the second artificial neural network and may probabilistically present presence or absence of the mental disorder for the patient. Referring to FIG. 2, the processor 140 may output a test protocol for the patient as a guideline for the mental disorder diagnosis of the patient based on the analysis results of the first artificial neural network and the analysis results of the second artificial neural network. The processor 140 may provide the test protocol based on the test region and the test process.

The processor 140 may output information regarding whether the patient has a mental disorder and the corresponding probability based on the first artificial neural network. The processor 140 may determine at least one test region in the brain image. In addition, the processor 140 may detect a relative importance of each of data items of medical multimodal data based on the first artificial neural network. The first artificial neural network may be configured based on at least one of a class activation mapping; (CAM) scheme, a convolutional neural network (CNN), and a fully connected neural network.

Figure 4A:
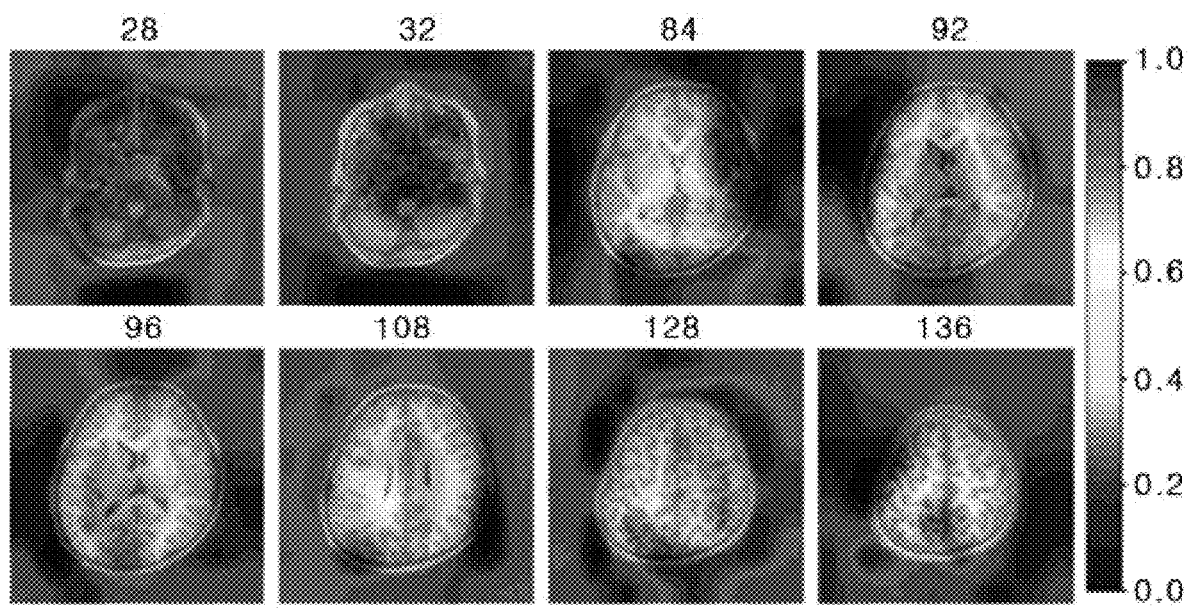
FIGS. 4A, 4B, 4C, and 4D illustrate examples of describing an operation characteristic of a first artificial neural network of a computer system according to example embodiments.
Figure 4B:
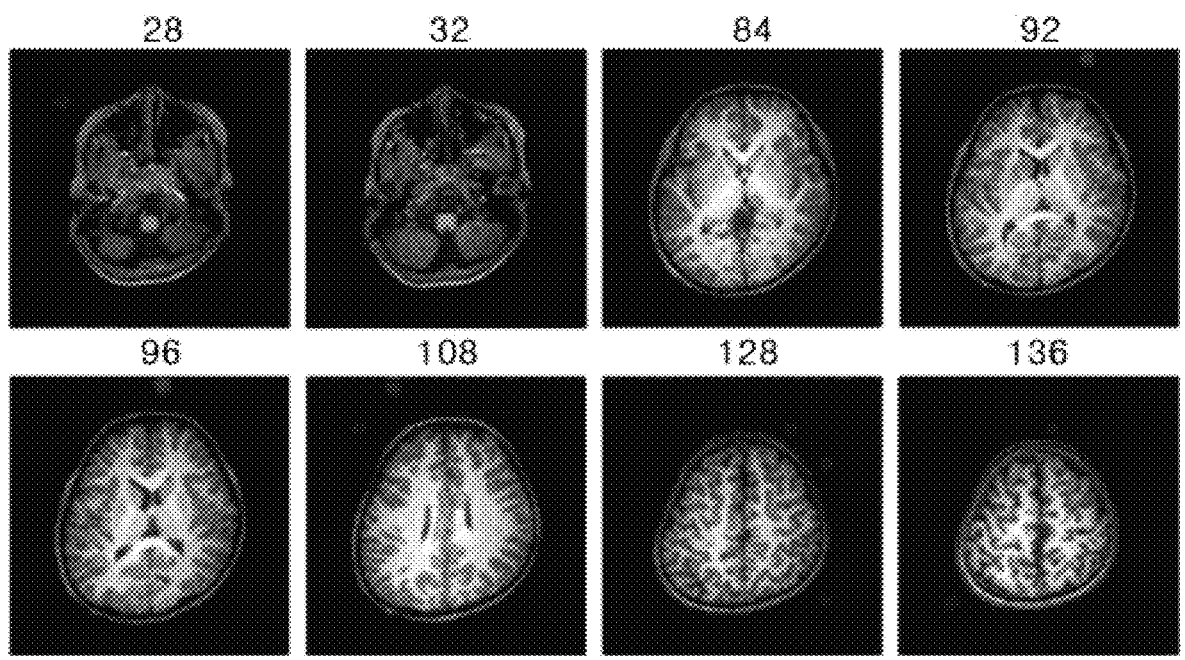
Figure 4C:
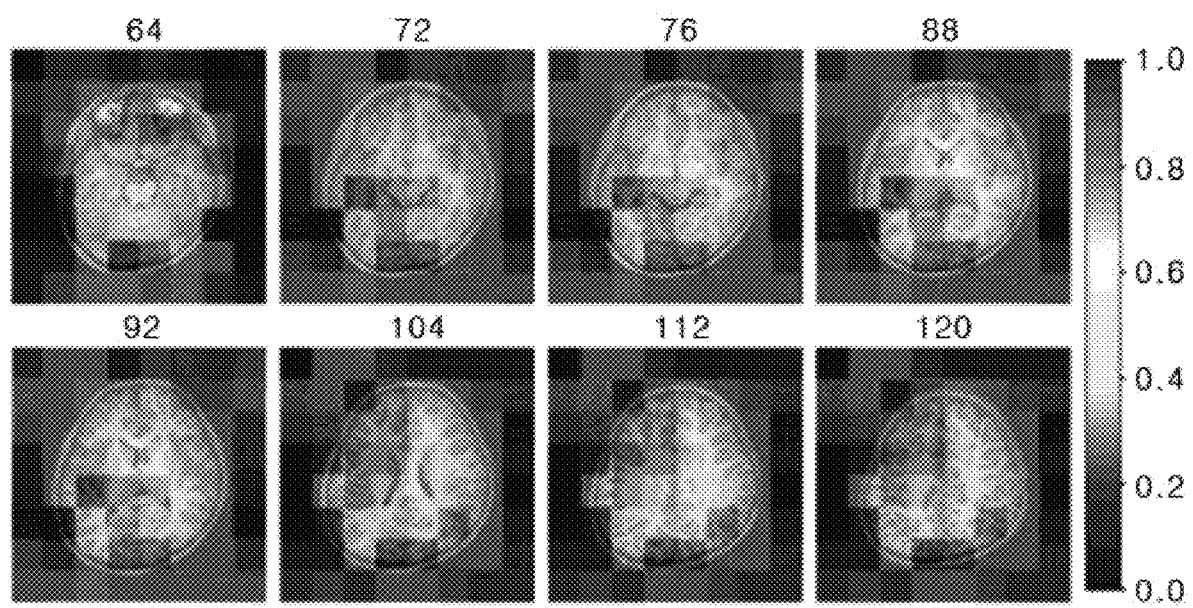
Figure 4D:
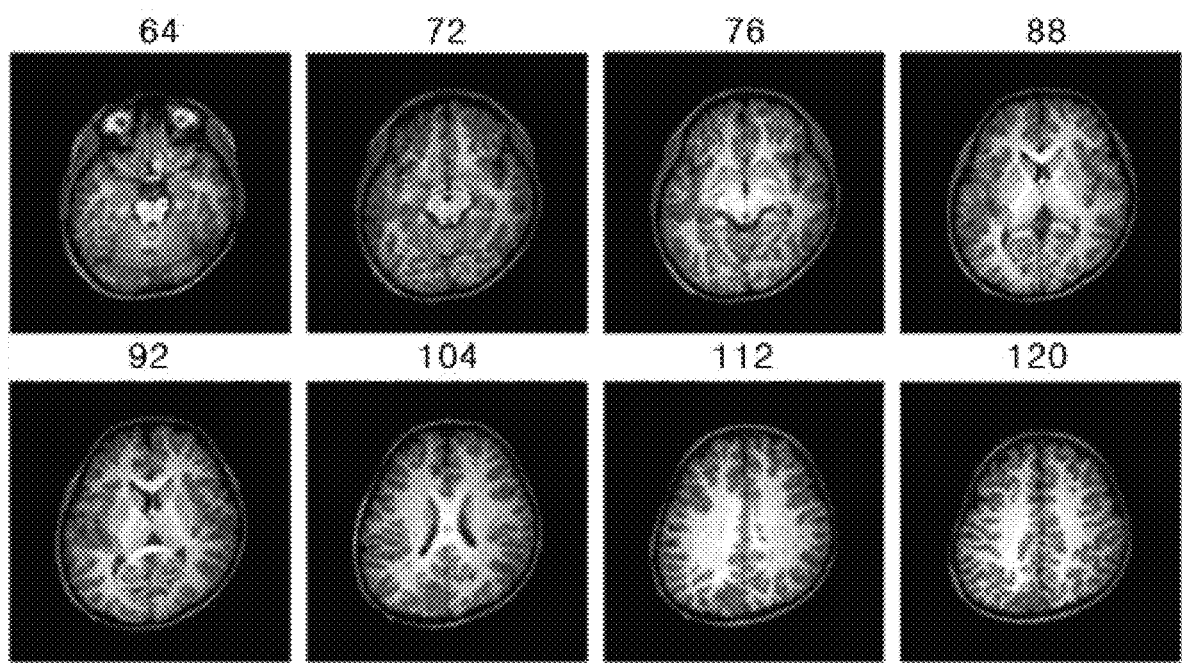

According to an example embodiment, with respect to medical single-modal data, the first artificial neural network may be configured as illustrated in FIGS. 3A and 3B and may analyze the medical single-modal data and visualize the medical single-modal data as illustrated in at least one of FIGS. 4A, 4B, 4C, and 4D. For example, the medical single-modal data may be a brain image of the patient acquired through MRI and the processor 140 may visualize the test region in the brain image of the patient based on the first artificial neural network. For example, the first artificial neural network may probabilistically output information regarding whether the patient has a mental disorder from the brain image of the patient based on a deep CNN as illustrated in FIG. 3A. The first artificial neural network may output a test image from the deep CNN by applying a CAM scheme as illustrated in FIG. 3B. Here, referring to FIGS. 4A, 4B, 4C, and 4D, the first artificial neural network may visualize the test region through the test image. At least one of a position, a shape, a size, and an importance of the test region may be visualized. Here, the importance of the test region may be visualized using a predetermined heatmap. As illustrated in FIG. 4A or 4C, test regions may be visualized by distributing colors according to the heatmap over the entire test image. Alternatively, as illustrated in FIG. 4B or 4D, a test region having a highest importance may be visualized in color according to the heatmap. As another example, the deep CNN may be replaced with the fully connected neural network.

According to another example embodiment, with respect to medical multimodal data, the first artificial neural network may analyze the medical multimodal data and may visualize the medical multimodal data. Here, a relative importance of each of data items of the medical multimodal data may be visualized. Here, the relative importance of each of the data items may be visualized using a predetermined heatmap.

The processor 140 may output information regarding whether the patient has a mental disorder and the corresponding probability based on the second artificial neural network. The processor 140 may determine the test process based on the second artificial neural network. According to an example embodiment, when a plurality of test regions is determined in the brain image, the test process may include test order of the plurality of test regions in the brain image. According to another example embodiment, the test process may represent order in which data items of medical multimodal data are used for the mental disorder diagnosis of the patient. Here, since each of the data items is used in each of test stages, the test process may be represented as progress order of the test stages. The second artificial neural network may be a visual attention model configured based on a deep recurrent neural network (RNN) and reinforcement learning.

According to an example embodiment, with respect to medical single-modal data, the second artificial neural network may be configured based on the deep RNN and the reinforcement learning as illustrated in FIG. 5 and may determine test order for the medical single-modal data as illustrated in at least one of FIGS. 6A, 6B, and 6C. For example, the medical single-modal data may be a brain image of the patient acquired through MRI. Here, when test regions are determined in the brain image of the patient, the second artificial neural network may determine test order of the test regions in the brain image. Through this, the second artificial neural network may provide test order of test regions in the brain image as illustrated in at least one of FIGS. 6A, 6B, and 6C.

According to another example embodiment, with respect to medical multimodal data, the second artificial neural network may be configured based on the deep RNN and the reinforcement learning and may determine test order for the medical multimodal data. Here, order, that is, progress order of test stages in which data items of the medical multimodal data may be determined.

Figure 7:
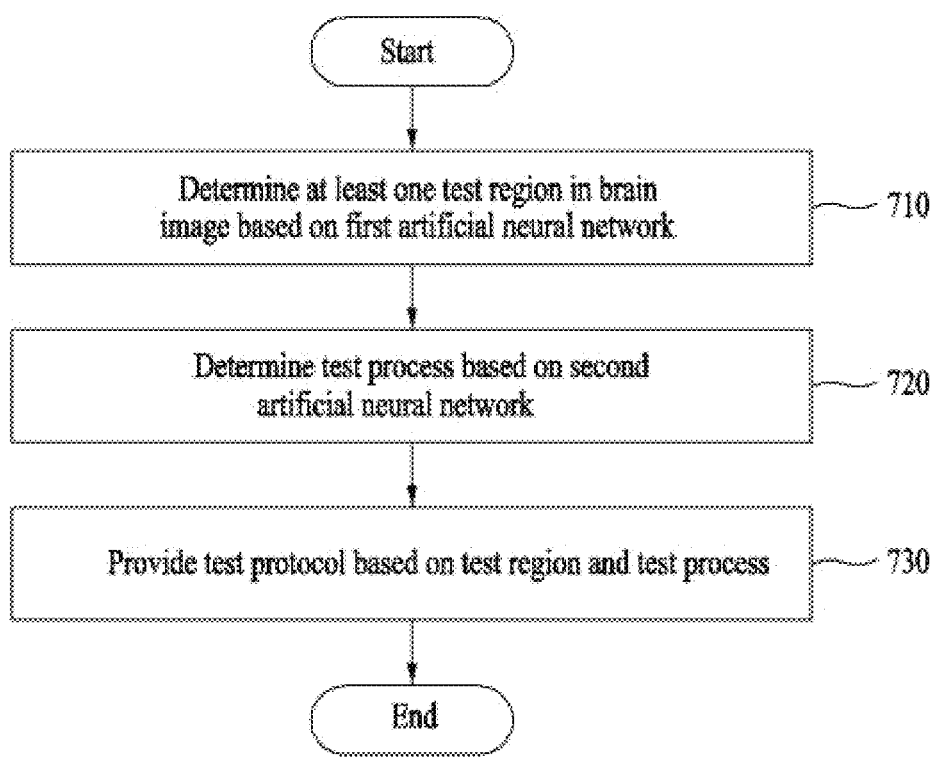
FIG. 7 is a flowchart illustrating a method performed by a computer system according to example embodiments.

FIG. 7 is a flowchart illustrating a method performed by the computer system 100 according to example embodiments. Here, FIG. 7 illustrates an example of a method of automatically searching for a mental disorder diagnosis protocol by the computer system 100. For example, mental disorder may include autism spectrum disorder (ADS).

Referring to FIG. 7, in operation 710, the computer system 100 may determine at least one test region in a brain image of a patient based on a first artificial neural network. The first artificial neural network may be configured based on at least one of a CAM scheme, a deep CNN, and a fully connected neural network. The processor 140 may analyze vectorized medical multimodal data being input, based on the first artificial neural network. Here, the medical multimodal data may include a plurality of data items acquired using different methods and the data items may include the brain image and at least one another data item. The processor 140 may output information regarding whether the patient has a mental disorder and a corresponding probability based on the first artificial neural network. The processor 140 may determine at least one test region in the brain image. The test region may represent a region to be examined for the mental disorder diagnosis in the brain image. Here, the processor 140 may visualize at least one of a position, a shape, a size, and an importance of the test region in the brain image. Here, the processor 140 may visualize the importance of the test region using a predetermined heatmap. In addition, the processor 140 may detect a relative importance of each of data items of medical multimodal data based on the first artificial neural network. Here, the processor 140 may visualize a relative importance of each of the data items of the medical multimodal data. Here, the processor 140 may visualize the relative importance of each of the data items using a predetermined heatmap.

In operation 720, the computer system 100 may determine a test process for the patient based on a second artificial neural network. Here, the second artificial neural network may be a visual attention model configured based on a deep RNN and reinforcement learning. The processor 140 may analyze vectorized medical multimodal data being input, based on the second artificial neural network. The processor 140 may output information regarding whether the patient has a mental disorder and a corresponding probability based on the second artificial neural network. The processor 140 may determine the test process based on the second artificial neural network. According to an example embodiment, when a plurality of test regions is determined in the brain image, the test process may include test order of the plurality of test regions in the brain image. According to another example, the test process may represent order in which data items of medical multimodal data are used for the mental disorder diagnosis of the patient. Here, since each of the data items is used in each of test stages, the test process may be represented as progress order of the test stages.

In operation 730, the computer system 100 may provide a test protocol for the patient based on the test region and the test process. The test protocol represents a test policy for the mental disorder diagnosis of the patient. The processor 140 may output the test protocol for the patient as a guideline for the mental disorder diagnosis of the patient based on the test region and the test process.

Through this, the user of the computer system 100, for example, medical staff such as a doctor may perform the mental disorder diagnosis for the patient based on the test protocol for the patient. That is, the user may concentratively examine the test region in the brain image. Here, the user may examine the test region based on an importance of each corresponding test region. The user may examine each of data items of medical multimodal data based on each corresponding importance. The user may examine test regions in test order of the test regions based on the test process. The user may examine each of data items in each of test stages in progress order of the test stages based on the test process. Therefore, the user may further accurately and easily diagnose mental disorder of the patient. Here, the user may probabilistically diagnose presence or absence of the mental disorder of the patient and may predict the severity of the mental disorder, which may lead to reducing an amount of time and cost used for the mental disorder diagnosis and further quickly performing the mental disorder diagnosis at high reliability.

According to example embodiments, the computer system 100 may automatically search for a highly reliable mental disorder diagnosis protocol through an application machine learning based on an artificial neural network and a method thereof. Here, the computer system 100 may determine a test region to be examined for a mental disorder diagnosis in a brain image and a test process for the mental disorder diagnosis and may provide a test protocol for a patient as a guideline for a mental disorder diagnosis of the patient based on the determined test region and test process. Through this, the user of the computer system 100 may more accurately and easily diagnose a mental disorder of the patient based on the test protocol. Here, the user may probabilistically diagnose presence or absence of the mental disorder of the patient and may predict the severity of the mental disorder, which may lead to reducing an amount of time and cost used for the mental disorder diagnosis and further quickly performing the mental disorder diagnosis at high reliability.

A method performed by the computer system 100 according to example embodiments may include operation 710 of determining at least one test region to be examined for a predetermined mental disorder diagnosis in a brain image of a patient based on a first artificial neural network, operation 720 of determining a test process for the mental disorder diagnosis for the patient based on a second artificial neural network, and operation 730 of providing a test protocol for the mental disorder diagnosis for the patient based on the test region and the test process.

According to example embodiments, operation 710 of determining the test region may include visualizing at least one of a position, a shape, a size, and an importance of the test region in the brain image.

According to example embodiments, operation 710 of determining the test region may include visualizing the importance using a predetermined heatmap.

According to example embodiments, the first artificial neural network may be configured based on a CAM scheme and at least one of a CNN and a fully connected neural network.

According to example embodiments, a plurality of test stages may be present for the mental disorder diagnosis, and the test process may include progress order of the plurality of test stages.

According to example embodiments, when a plurality of test regions is determined in the brain image, the test process may include test order of the plurality of test regions.

According to example embodiments, the second artificial neural network may be a visual attention model that is configured based on a deep RNN and a reinforcement learning.

According to example embodiments, the method may further include probabilistically presenting presence or absence of the mental disorder for the patient based on the first artificial neural network and the second artificial neural network.

According to example embodiments, the mental disorder may include ADS.

The computer system 100 according to example embodiments may include the memory 130 and the processor 140 configured to connect to the memory 130 and to execute at least one instruction stored in the memory 130.

According to example embodiments, the processor 140 may determine at least one test region to be examined for a predetermined mental disorder diagnosis in a brain image of a patient based on a first artificial neural network, may determine a test process for the mental disorder diagnosis for the patient based on a second artificial neural network, and may provide a test protocol for the mental disorder diagnosis for the patient based on the test region and the test process.

According to example embodiments, the processor 140 may visualize at least one of a position, a shape, a size, and an importance of the test region in the brain image.

According to example embodiments, the processor 140 may visualize the importance using a predetermined heatmap.

According to example embodiments, the first artificial neural network may be configured based on a CAM scheme and at least one of a CNN and a fully connected neural network.

According to example embodiments, a plurality of test stages may be present for the mental disorder diagnosis, and the test process may include progress order of the plurality of test stages.

According to example embodiments, when a plurality of test regions is determined in the brain image, the test process may include test order of the plurality of test regions.

According to example embodiments, the second artificial neural network may be a visual attention model that is configured based on a deep RNN and a reinforcement learning.

According to example embodiments, the processor 140 may be configured to probabilistically present presence or absence of the mental disorder for the patient based on the first artificial neural network and the second artificial neural network.

According to example embodiments, the mental disorder may include ADS.

The systems and/or apparatuses described herein may be implemented using hardware components, software components, and/or a combination thereof. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may be to continuously store a computer-executable program or to temporarily store the same for execution or download. Also, the media may include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in sequential, parallel, iterative, or heuristic manner. Alternatively, at least one of the operations may be performed in different sequence or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method performed by a computer system, the method comprising:
   determining at least one test region to be examined for a predetermined mental disorder diagnosis in a brain image of a patient based on a first artificial neural network, wherein the first artificial neural network is configured based on a class activation mapping (CAM) scheme and at least one of a convolutional neural network (CNN) or a fully connected neural network;
   determining a test process for the predetermined mental disorder diagnosis for the patient based on a second artificial neural network; and
   providing a test protocol for the predetermined mental disorder diagnosis for the patient based on the test region and the test process.

2. The method of claim 1, wherein the determining of the test region comprises visualizing at least one of a position, a shape, a size, and an importance of the test region in the brain image.

3. The method of claim 2, wherein the determining of the test region comprises visualizing the importance using a predetermined heatmap.

4. The method of claim 1, wherein a plurality of test stages is present for the mental disorder diagnosis, and
   wherein the test process comprises progress order of the plurality of test stages.

5. The method of claim 1, wherein the test process comprises test order of a plurality of test regions when the plurality of test regions is determined in the brain image.

6. The method of claim 1, wherein the second artificial neural network is a visual attention model that is configured based on a deep recurrent neural network (RNN) and a reinforcement learning.

7. The method of claim 1, further comprising:
   probabilistically presenting presence or absence of the mental disorder for the patient based on the first artificial neural network and the second artificial neural network.

8. The method of claim 1, wherein the mental disorder comprises autism spectrum disorder (ASD).

9. A computer system comprising:
   a memory; and
   a processor configured to connect to the memory and to execute at least one instruction stored in the memory,
   wherein the processor is configured to:
   determine at least one test region to be examined for a predetermined mental disorder diagnosis in a brain image of a patient based on a first artificial neural network, wherein the first artificial neural network is configured based on a class activation mapping (CAM) scheme and at least one of a convolutional neural network (CNN) or a fully connected neural network,
   determine a test process for the predetermined mental disorder diagnosis for the patient based on a second artificial neural network, and
   provide a test protocol for the predetermined mental disorder diagnosis for the patient based on the test region and the test process.

10. The computer system of claim 9, wherein the processor is configured to visualize at least one of a position, a shape, a size, and an importance of the test region in the brain image.

11. The computer system of claim 10, wherein the processor is configured to visualize the importance using a predetermined heatmap.

12. The computer system of claim 9, wherein a plurality of test stages is present for the mental disorder diagnosis, and
    wherein the test process comprises progress order of the plurality of test stages.

13. The computer system of claim 9, wherein the test process comprises test order of a plurality of test regions when the plurality of test regions is determined in the brain image.

14. The computer system of claim 9, wherein the second artificial neural network is a visual attention model that is configured based on a deep recurrent neural network (RNN) and a reinforcement learning.

15. The computer system of claim 9, wherein the processor is configured to probabilistically present presence or absence of the mental disorder for the patient based on the first artificial neural network and the second artificial neural network.

16. The computer system of claim 9, wherein the mental disorder comprises autism spectrum disorder (ASD).

17. A non-transitory computer-readable record medium storing instructions that, when executed by a processor, cause the processor to perform a method comprising:
    determining at least one test region to be examined for a predetermined mental disorder diagnosis in a brain image of a patient based on a first artificial neural network, wherein the first artificial neural network is configured based on at least one of a class activation mapping (CAM) scheme, at least one of a convolutional neural network (CNN), or a fully connected neural network;
    determining a test process for the predetermined mental disorder diagnosis for the patient based on a second artificial neural network; and
    providing a test protocol for the predetermined mental disorder diagnosis for the patient based on the test region and the test process.

18. The non-transitory computer-readable record medium of claim 17, wherein the determining of the test region comprises visualizing at least one of a position, a shape, a size, and an importance of the test region in the brain image, and wherein the test process comprises test order of a plurality of test regions when the plurality of test regions is determined in the brain image.

\* \* \* \* \*